(12) United States Patent
Major et al.

(10) Patent No.: US 9,045,882 B2
(45) Date of Patent: Jun. 2, 2015

(54) WORKING MACHINE

(75) Inventors: Gary Major, Nantwich (GB); Martyn L. Molsom, Savannah, GA (US)

(73) Assignee: J.C. BAMFORD EXCAVATORS LIMITED, Uttoxeter (GB)

(*) Notice: Subject to any disclaimer, the term of this patent is extended or adjusted under 35 U.S.C. 154(b) by 750 days.

(21) Appl. No.: 13/024,263

(22) Filed: Feb. 9, 2011

(65) Prior Publication Data
US 2011/0217151 A1 Sep. 8, 2011

(30) Foreign Application Priority Data

Feb. 11, 2010 (GB) .................................. 1002326.5

(51) Int. Cl.
*B66C 23/00* (2006.01)
*E02F 3/34* (2006.01)
*A01G 23/00* (2006.01)
(Continued)

(52) U.S. Cl.
CPC ............ *E02F 3/3405* (2013.01); *A01G 23/006* (2013.01); *B62D 33/0617* (2013.01); *B62D 33/067* (2013.01); *E02F 3/283* (2013.01); *E02F 9/166* (2013.01)

(58) Field of Classification Search
CPC ........... E02F 3/627; E02F 3/6273; E02F 3/34; E02F 3/3414; E02F 3/3405; E02F 3/283
USPC .................. 414/686, 680, 685, 815; 212/261; 296/190.05
See application file for complete search history.

(56) References Cited

U.S. PATENT DOCUMENTS 4,055,255 A 10/1977 Vasquez
5,240,366 A 8/1993 Bamford
(Continued)

FOREIGN PATENT DOCUMENTS

CN 201317948 Y 9/2009
EP 0 976 878 A2 2/2000
(Continued)

OTHER PUBLICATIONS

Search Report for GB 1002326.5, dated Jun. 16, 2010.
(Continued)

*Primary Examiner* — Saul Rodriguez
*Assistant Examiner* — Gabriela Puig
(74) *Attorney, Agent, or Firm* — Marshall, Gerstein & Borun LLP

(57) ABSTRACT

A working machine (10) includes a body (11) having a front end (12) and a rear end (13), and a ground engaging propulsion structure (15) whereby the machine (10) may be driven over the ground, a loading arm assembly (25) which includes a loading arm (26) which is mounted at one end (26a) relative to the body (11) and which extends forwardly at or towards one side of the body (11), beyond the front end (12) of the body (11), to a second end (26b) where there is amounting for a working implement (35), the loading arm assembly (25) including a first link (28) which is pivotally connected at or adjacent the one end (26a) of the loading arm (26) and also to the body (11) at a first mounting position (27), and a second link (32) which is pivotally connected to the arm (26) between the first and second ends (26a, 26b) of the arm (26), and to the body at a second mounting position (36) which is forwards of the first mounting position (27), and the machine (10) including an actuator (40) which acts between the loading arm (26) and the body (11) to raise and lower the loading arm (26) relative to the body (11).

12 Claims, 6 Drawing Sheets

(51) Int. Cl.
  *B62D 33/06* (2006.01)
  *B62D 33/067* (2006.01)
  *E02F 3/28* (2006.01)
  *E02F 9/16* (2006.01)

(56) References Cited

U.S. PATENT DOCUMENTS

| | | | |
|---|---|---|---|
| 5,470,190 A | 11/1995 | Bamford et al. | |
| 5,860,479 A | 1/1999 | LaFollette | |
| 6,439,827 B1 | 8/2002 | Ratcliffe | |
| 6,474,933 B1 | 11/2002 | Hoechst et al. | |
| 7,507,064 B2 * | 3/2009 | Shibuya | 414/686 |
| 8,152,433 B2 * | 4/2012 | Yamada et al. | 414/686 |
| 2003/0175105 A1 | 9/2003 | Hilvers et al. | |
| 2004/0119320 A1 | 6/2004 | Albright et al. | |
| 2004/0228715 A1 | 11/2004 | Roan et al. | |
| 2007/0128012 A1 | 6/2007 | Yamada et al. | |
| 2007/0137338 A1 | 6/2007 | Nishi et al. | |
| 2008/0267754 A1 * | 10/2008 | Yamada et al. | 414/685 |
| 2009/0192682 A1 | 7/2009 | Ciarla et al. | |
| 2010/0003117 A1 | 1/2010 | Yamashita et al. | |

FOREIGN PATENT DOCUMENTS

| | | | |
|---|---|---|---|
| EP | 1325986 A1 | 7/2003 | |
| EP | 1547905 A2 * | 6/2005 | B62D 7/02 |
| FR | 2 849 009 A1 | 6/2004 | |
| GB | 2278826 A | 12/1994 | |
| GB | 2 344 571 A | 6/2000 | |
| JP | 1993058239 A | 3/1993 | |
| KR | 10-2007-0037317 | 4/2007 | |
| WO | WO-99/10606 A1 | 3/1999 | |

OTHER PUBLICATIONS

Extended European Search Report for European Patent Application No. 11154167.8, dated May 6, 2011.
Photograph of a J.C. Bamford 170HF machine, first sold in 1999.

* cited by examiner

WORKING MACHINE

SUMMARY

This invention relates to a working machine and more particularly to a working machine of the kind which has a body, ground engaging propulsion structure and a loading arm assembly.

According to the invention we provide a working machine which includes a body having a front end and a rear end, the body being provided with a ground engaging propulsion structure whereby the machine may be driven over the ground, a loading arm assembly which includes a loading arm which is mounted at one end relative to the body and which extends forwardly at or towards one side of the body, beyond the front end of the body, to a second end where there is a mounting for a working implement, the loading arm assembly including a mounting structure for mounting the loading arm to the body, the mounting structure including a first link which is pivotally connected at or adjacent the one end of the loading arm and also to the body at a first mounting position, and a second link which is pivotally connected to the arm between the first and second ends of the arm, and to the body at a second mounting position which is forwards of the first mounting position, and the machine including an actuator which acts between the loading arm and the body to raise and lower the loading arm relative to the body.

The first and second links thus provide two opposite sides of a quadrilateral structure (best appreciated when the loading arm is raised), with the other two opposite sides being provided by, on the one hand, the length of the loading arm between where the first and second links are pivotally mounted, and on the other hand the length of the body between the first and second mounting positions.

This geometry of the first and second links and their positions of pivotal connection to the body and the arm, provides the advantage that as the arm is raised and lowered, the second end of the loading arm, where the working implement is in use mounted, moves generally vertically up and down, when the machine is generally level. In actuality, the movement will not be exactly vertical, but by carefully selecting design parameters for the links, a substantially vertical working implement movement can be achieved.

This is important because the centre of gravity of the machine does not then shift forwards and backwards significantly in response to loading arm up and down movements. If the working implement is not moved up and down substantially vertically, this can lead to longitudinal machine imbalance and thus the envelope of allowed loading arm movement would need to be restricted to maintain machine stability. The present invention enables the extension of the reach of the loader arm at full height compared to a radial arm machine in which the loader arm is simply pivoted to the body and the load moves up and down along a definite curve.

Preferably the actuator is a linearly extendible actuator which is pivotally mounted at one end to the loading arm, preferably between where the first and second links are pivotally mounted to the loading arm, and the actuator is pivotally mounted at a second end to the body between the first and second mounting positions.

In a preferred embodiment the first link provides for a shorter distance between its pivotal connections to the loading arm and the first mounting position of the body than the distance afforded by the second link between its pivotal connections to the loading arm and the second mounting position of the body.

Although the invention may be applied to a wide variety of working machine configurations, the invention is particularly applicable where the machine is a so called skid-steer loading machine, in which the ground engaging propulsion structure includes a pair of wheels or a continuous loop track, at either side of the body, and steering is effected by differentially driving the wheels or at least one of the wheels of the pair, or the track, at one side of the body relative to the wheel or wheels or track at the other side of the body, or a component loading machine. Such machines tend to be compact and thus instability due to shifting centre of gravity as a load is moved as the arm is raised and lowered is a particular issue.

Whereas a vertical lift arrangement could be provided by simultaneously telescoping a telescopic loading arm during lifting and lowering of the loading min, the present proposal enables vertical lift to be achieved with a loading arm which is not telescopic but is substantially rigid between the first and second ends. Thus the present invention provides a most economic solution.

The working machine may include a cab mounted on the body. The cab may be mounted towards a second side of the body opposite to the first side where the arm in extends, and preferably at the front end of the body so that no part of the body extends significantly forwardly of the cab.

The loading arm may be a single loading arm.

In this specification, by "single arm" we mean that either the arm is, between its first and second ends, either a closed fabrication or casting, or where a fabrication of arm parts, that at least no body part of the machine is needed to be received between any parts of the arm to permit the arm to be lowered to a fully lowered condition when the working implement is on the ground.

The single loading arm of the loading arm assembly may at the second end of the arm include a transverse member which provides support for mounting of the working implement at the second end of the loading arm.

In each case, the first link of the arm mounting structure of the loader arm assembly may include a first leg which provides for the pivotal mounting to the body at the first mounting position, and a second leg which provides for the pivotal mounting to the loading arm at or adjacent the one end of the loading arm, the first and second legs subtending an obtuse angle between them with the apex of the angle pointing forwardly of the machine.

The second link is preferably straight between its pivotal mountings to the loading arm and the second mounting position of the body

BRIEF DESCRIPTION OF THE DRAWINGS

Embodiments of the invention will now be described with reference to the accompanying drawings in which.

DETAILED DESCRIPTION

Figure 1:
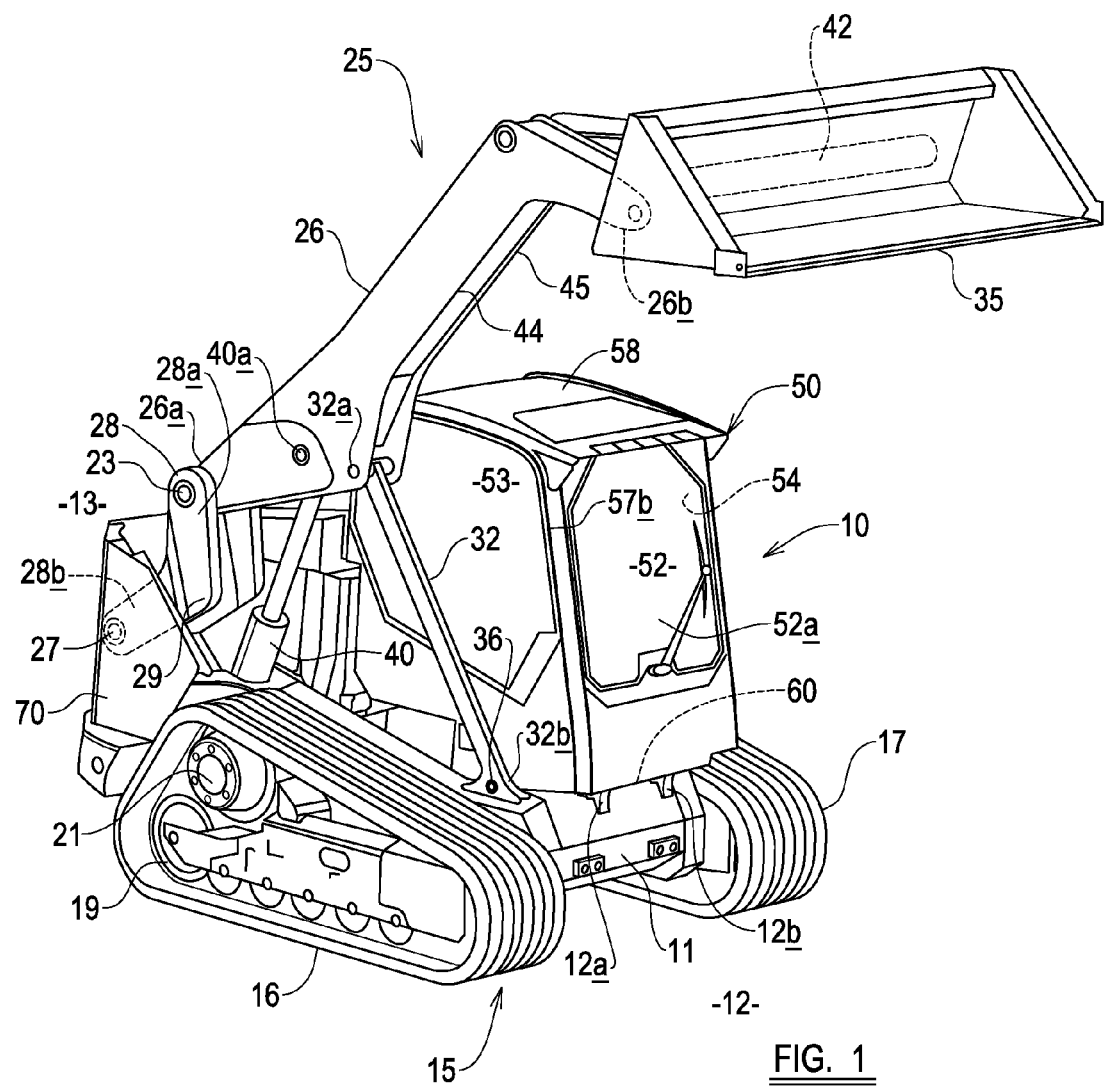
FIG. 1 is an illustrative perspective view from one side and the front end of a working machine in accordance with the invention, showing a loading arm in a raised condition.

Referring to the drawings a working machine 10 is shown which includes a body 11 with a front end 12 and a rear end 13 which represent respectively, the normal forward and reverse directions of travel of the machine 10.

Figure 4:
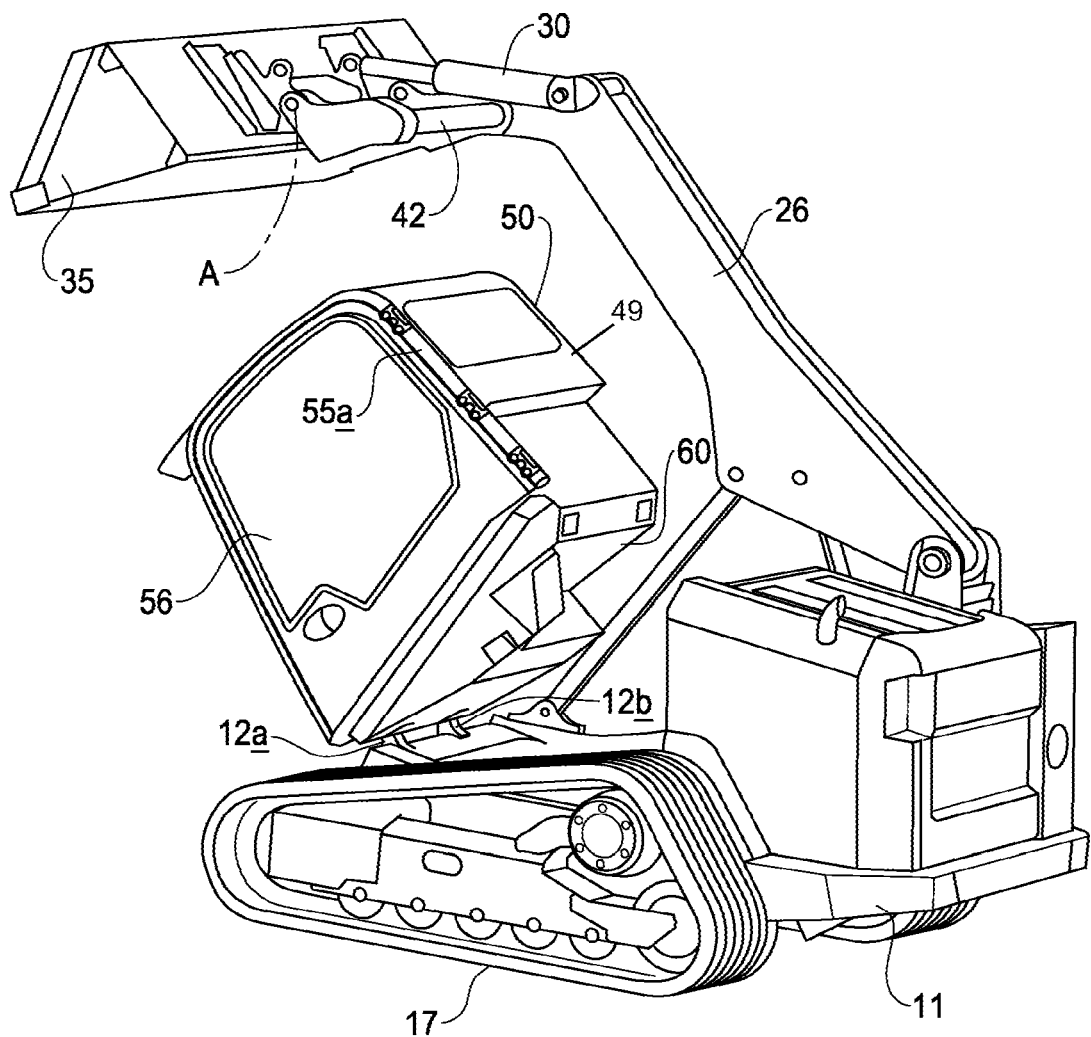
FIG. 4 is a view similar to FIG. 3 but showing the loading arm raised and the cab in a condition to allow for maintenance.
Figure 5:
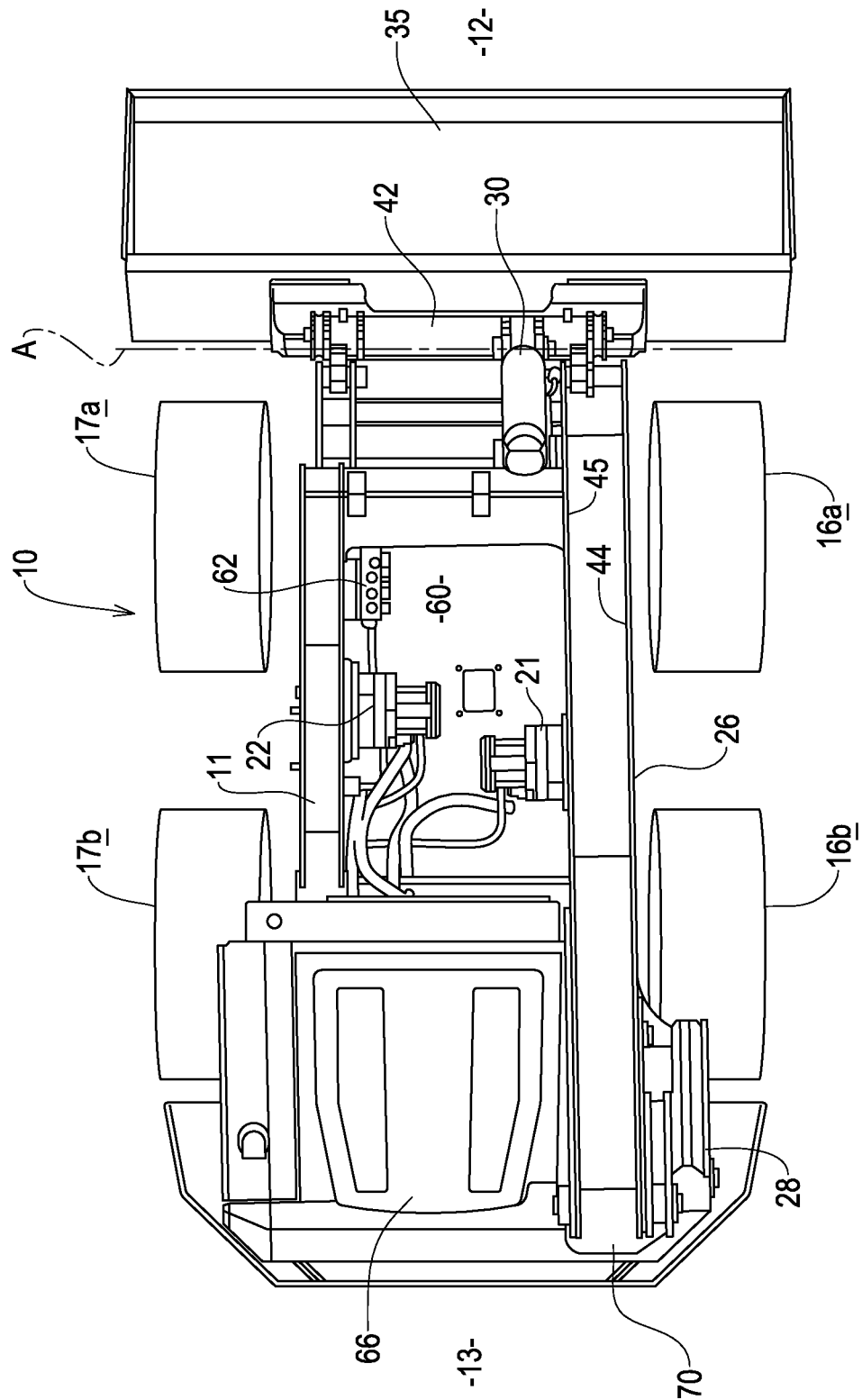
FIG. 5 is an underside plan view of the machine shown in the previous figures, but modified.

The body 11 includes a ground engaging propulsion structure 15 which in the case of the machine of FIGS. 1 to 4, includes a continuous loop track 16, 17 at each side of the body 11, and in the case of the machine of FIG. 5, a pair of wheels 16a, 16b; 17a 17b at each side of the body 11.

The tracks 16, 17 are each driven by respective drive sprockets 19, 20 which are in turn, driven by respective hydraulic motors 21, 22. However the tracks 16, 17 could be driven through a transmission by a single hydraulic motor, an engine or some other motive device. In the FIG. 5 machine, the wheels 16a, 16b at the one side of the body 11 are both driven via a transmission such as a drive chain and/or meshing gears (not seen), from a first hydraulic motor 21, and the wheels 17a, 17b at a second opposite side of the body 11 are driven via a similar transmission in this example, by a second hydraulic motor 22.

It can be seen in FIG. 5 that the first and second hydraulic motors 21, 22 are offset, that is their drive shafts are parallel but spaced from one another. This provides for more space for assembly and maintenance and enables axially longer motors 21, 22 to be used than in an arrangement where the drive shafts of the motors 21, 22 are in line.

The machine 10 further includes a loading arm assembly 25 which includes a single, loading arm 26 and an arm mounting structure for mounting the loading arm 26 relative to the body 11.

The loading arm mounting structure includes a first link 28 which is pivotally mounted at 23 or towards the one end 26a of the loader arm 26, and to the body 11 at a first mounting position 27. The first link 28 in this example includes a first leg 28a and a second leg 28b. The first leg 28a provides for the pivotal mounting 23 to one end 26a of the loader arm 26, whilst the second leg 28b provides for the pivotal mounting of the first link 28 to the body 11 at the first mounting position 27. The legs 28a, 28b subtend between them an obtuse angle, the apex 29 of the angle pointing towards the front end 12 of the machine 10.

The legs 28a, 28b may be integral or connected, but in each case the first link 28 sets a fixed distance between the respective pivotal connections at 23 and 27 of the arm 26 and body 11.

The loading arm mounting structure includes a second link 32 which is in this example substantially straight and rigid, the second link 32 at one end being pivotally mounted to the loading arm 26 at a position 32a along the loading arm 26 which lies between the one end 26a of the loading arm 26 and a second end 26b of the loading arm 26 which is forwardly beyond the body 11. The loading arm 26 extends forwardly from the one end 26a where the arm 26 is mounted relative to the body 11 by the first link 28, to the second end 26b, where in use as shown, a working implement such as a loading bucket 35 or forks, is mounted. The second link 32 is pivotally mounted to the body 11 too, at a second end 32b opposite to the first end pivotal mounting 32a to the arm 26, at a second mounting position 36 which is forwardly of the first mounting position 27.

The second link 32 is in this design, longer than the distance between the pivotal connections afforded by the first link 28 to the loading arm end 26a at 23, and the first mounting position 27 of the body 11.

Between the first and second links 28, 32, extending between the body 11 and the loading arm 26 is a, telescopic, linearly extending actuator 40, which is pivoted at one end to the loading arm 26 at a position 40a between the pivotal connections 26a, 32a to the first and second links 28, 32, and at the opposite end to the body 11, between (but below) the first and second mounting positions 27, 36.

The first and second links 28, 32 provide an opposite two sides of a quadrilateral (which is best seen when the loader arm 26 is raised), with the other opposite two sides being provided by on the one hand the length of loader arm 26 between the pivotal connections 23, 32a to the first and second links 28, 32, and on the other hand the length of the body 11 between the first and second mounting positions 27, 36.

As the actuator 40 is extended and retracted, the loading arm 26 will be raised and lowered, or rather the second end 26b of the loading arm 26 will be raised and lowered relative to the body 11, thus to raise and lower a load carried by the working implement 35.

Figure 2:
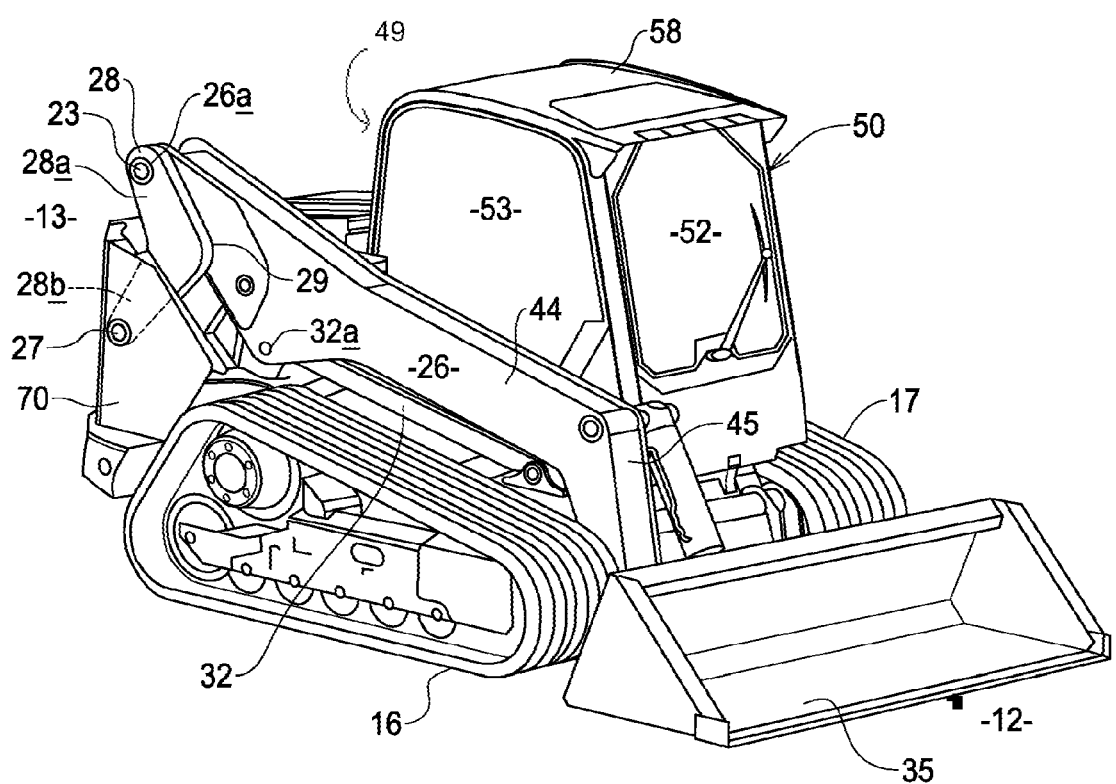
FIG. 2 is a view similar to FIG. 1 but showing the loading arm in a lowered condition.

As the loader arm 26 is lowered to its lowermost condition, as seen in FIG. 2, it can be seen that the second link 32 will extend generally along the body 11 adjacent the length of the body 11 between the first and second mounting positions 27, 36, under the arm 26, and with at least a major portion of the length of the loader arm 26 parallel. The first link 28 is pivoted rearwardly from the position indicated in FIG. 1.

The effect of the geometry described is that as the loading arm 26 is raised and lowered, the second end 26b, and the working implement 35 carried at the second end 26b, will move up and down generally vertically (assuming the machine 10 is level), thereby to minimise shifts in the centre of gravity forwardly and rearwardly of the machine 10. Although in actuality the working implement 35 and load will move slightly towards and away from the body 11 during raising and lowering, this movement will be along a shallow arc and so there will be a slight and gentle shift of the centre of gravity which should not significantly affect the longitudinal stability of the machine 10.

More importantly, the generally vertical lift geometry permits of greater reach at height than with a so-called radial arm machine in which the load moves up and down along a curve.

A single arm 26 also provides for better visibility, especially at the rear of the machine 10.

The loading arm 26 in this example includes a transverse member 42 at the second end 26b of the arm 26, the portion 42 providing support for the working implement 35. Between its first and second ends 26a, 26b the loading arm 26 is substantially rigid.

The working implement is pivotally mounted at the outer second end 26b of the loading arm 26, for movement about a pivot axis indicated at A in FIG. 6. Pivotal movement between the working implement 35 and the loading arm 26, is achieved by a second linearly extending actuator 30 which is pivotally mounted to each of the arm 26 and the working implement 35.

Desirably, during raising and lowering of the arm, the second actuator 30 is operated to maintain the working implement 35 level, either under operator control or preferably automatically by a controller which is sensitive to movement of the loader arm 26 and adjusts the attitude of the working implement 35 relative to the loading arm 26, in response.

In actuality as seen in the figures, the single arm 26 is provided in this example by a pair of closely spaced parallel plates 44, 45, and the first link 28 includes a pair of link plates joined together as a unitary component, one at each side of the plates 44, 45, but the second link 32 is a unitary member. In another example, the loader arm 26 could be of unitary, e.g. cast construction, or otherwise fabricated i.e. as a box section and/or fabrication in longitudinal sections. In each case though only a single loading arm, only at one side of the machine 10, is provided, and when the arm 26 is fully lowered, where the arm 26 includes e.g. a pair of plates 44, 45 no part of the body 11 needs to be received between the plates or other arm parts, to achieve full lowering of the arm 26 so as to lower the implement 35 to the ground.

The body 11 mounts an operator's cab 50 which is offset from a centre of the machine 10 towards a second body side opposite the first side where the loader arm assembly 25 is provided. The cab 50 is provided right at the front end 12 of the body 11 and preferably no part of the body 11 extends significantly forwardly of the cab 50, i.e. not beyond 60 mm and preferably less than 50 mm.

The cab 50 has a front 52 which is substantially entirely, a windscreen 52a in this example, but could be partially glazed and/or open as required, a first at least partially glazed side 53 alongside the loading arm assembly 25, but a barrier could be provided by wire mesh, and an entirely open second opposite side 54 which is bounded by a cab frame 55 and affords a substantially unobstructed opening for the access and egress of an operator, to and from the cab 50. The cab frame 55 mounts an operator access door 56 which when closed, closes the open cab side 54. As can be seen from FIG. 3, the access door 56 is substantially full cab length between the front 52 and a rear 49 at the second cab side 54 and substantially full cab height from a cab roof 58 to a cab floor 60 at the second side 54 of the cab 50. The door 56 might alternatively only extend for part of the cab height as required. The cab floor 60 is at a level just below the upper level of the track 17 in the FIGS. 1 to 4 embodiment, and just below wheel 17a, 17b height in the FIG. 5 embodiment. In this example, the door 56 does not extend to the floor 60 so the door 56 can be pivoted open over the track 17/wheels to permit a machine operator to enter and leave the cab 50 with minimal restriction.

In the example where the door is substantially full height, the door 56 is at least partially glazed, but may be substantially a glazing panel over its full extent, the access door 56 in each case being pivoted by hinges 56a to a rear post 55a of the cab frame 55, but in another example, the access door 56 could be otherwise hinged.

The cab frame 55 preferably is provided by a pair of inverted generally U-shaped frames 57a, 57b with at least at the open cab side 54, no intervening frame part. The U-shaped frames 57a, 57b may have panels attached to them to provide the roof 58, cab side 53 and the cab rear 59, and the frame 55 includes transverse frame members which connect the frames 57a, 57b to provide support for the floor 60 which may be a moulded structure or fabricated steel structure.

As will be appreciated from FIG. 4, the cab 50 is movable relative to the body 11 from the "in use" condition indicated in the previous figures, to a condition to allow for access to beneath the cab 50 for maintenance purposes.

For example beneath the cab 50 there may be accommodated the hydraulic drive motor or motors 21, 22 where provided, and/or transmission components. A hydraulic pump may be accommodated at least in part beneath the cab 50 as well as control components e.g. as shown at 62 in FIG. 5.

In this example the cab 50 is movable by being mounted to the front end 12 of the body 11 by hinge devices 12a, 12b, the cab 50 thus being pivotal forwardly. Before the cab 50 can thus be pivoted, the loader arm 26 needs to be raised as shown in FIG. 4, clear of the cab 50, so that the working implement 35 etc. and/or transverse member 42, is/are clear of to where the cab 50 is to pivot. As desired, a latch mechanism of the machine 10 which retains the cab 50 ordinarily in its in use condition, may include one or more interlocks so that the cab 50 cannot be released for forward pivoting until the loading arm 26 is adequately raised i.e. to a threshold raised position.

As desired, a resilient device such as one or more springs (not shown) may be provided to assist forward pivoting of the cab 50. With the cab 50 in the condition shown in FIG. 4, access to items beneath the cab 50 e.g. for maintenance purposes may readily be gained.

In the example shown in the drawings, the cab floor 60 is integrated with the remainder of the cab 50. This means that the entire cab 50 can be prefabricated as a module prior to being assembled to the remainder of the machine 10. This facilitates production of an improved cab 50 in which better sealing against the ingress of dust and noise can be obtained.

The body 11 further mounts an engine 65 in an engine housing 66, at a position at the rear end 13 of the body, generally centrally of the body 11, behind the cab 50, and alongside a tower portion 70 of the body 11, which provides for the pivotal mounting of the first link 28 at the first mounting position 27, to the body 11. In this example, a top 66a of the engine housing 66 is low level, and so the structural rear 59 of the cab 50 includes a glazed portion to enable an operator to see out of the cab 50 over the engine housing 66.

In another example, where the engine 65 is elsewhere provided on the body 11, the cab 50 could pivot rearwardly rather than forwardly as suggested by FIG. 4, or even to the side. In each case though, because of the single loading arm 26, only at one side of the body 11, when the arm 26 is raised the arm 26 presents no obstacle to accessing beneath the cab 50.

Figure 3:
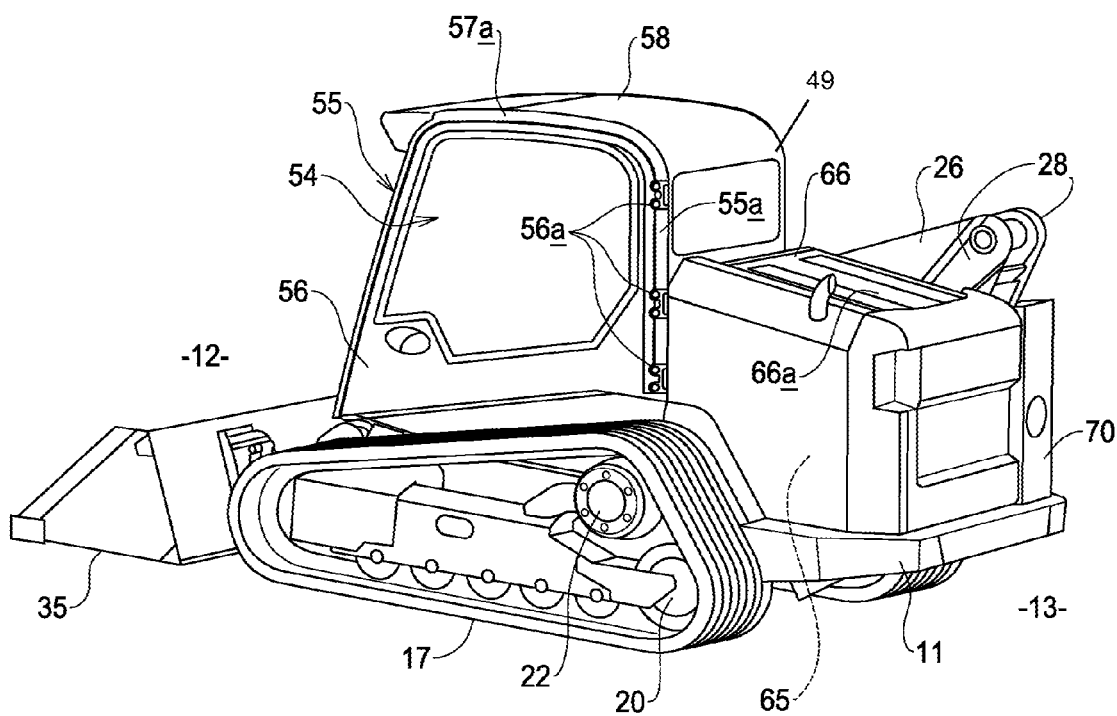
FIG. 3 is an illustrative perspective view of the machine of FIGS. 1 and 2 but from a second side and the rear end, and with the loader arm lowered.
Figure 3A:
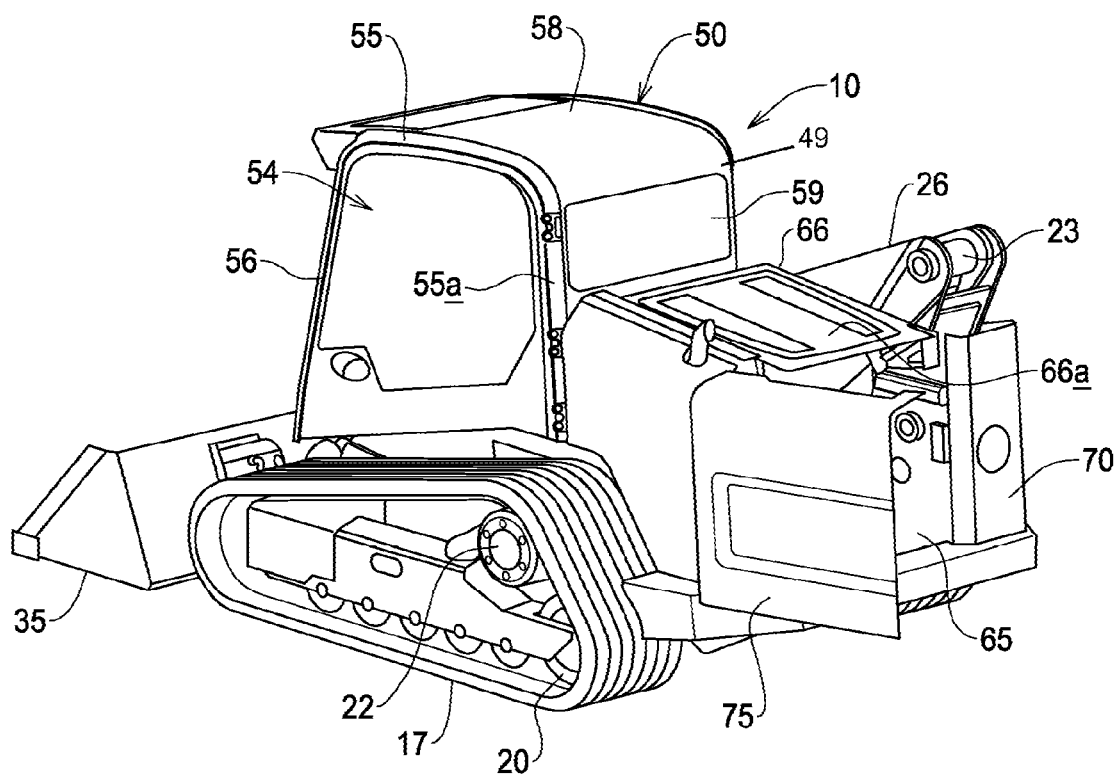
FIG. 3A is a view similar to FIG. 3 but showing an engine access door of the machine which is closed in FIG. 3, open.

In FIG. 3A it can be seen that in the engine housing 66 there is provided an engine access door 75. In the example this extends across substantially the entire width of the engine housing 66 at the rear end 13 of the machine 10. The engine access door 75 is hinged to the remainder of the housing 66 for sideways opening. Desirably the engine access door 75 opens for about 75% of the width of the machine body 11.

Various other modifications to those described may be made without departing from the scope of the invention as will be apparent to those skilled in the art.

In a modification, instead of the loading arm assembly 25 having a single loading arm 26, the assembly 25 may have a plurality of arms, e.g. an arm at each side of the cab, with the cab positioned generally centrally of the body 11. The arms may need to be connected by transverse arm members.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A working machine which includes a body having a front end and a rear end, the body being provided with a ground engaging propulsion structure including a pair of wheels or a continuous loop track at either side of the body, and steering is effected by differentially driving the ground engaging propulsion structure, the ground engaging structure defining a skid steer loading machine, whereby the machine may be driven over the ground, a loading arm assembly which includes a single loading arm which is mounted at one end relative to the body and which extends forwardly at or towards one side of the body, beyond the front end of the body, to a second end where there is a mounting for a working implement, the loading arm assembly including a mounting structure for mounting the loading arm to the body, the mounting structure including a first link which is pivotally connected at or adjacent the one end of the loading arm and also to the body at a first mounting position, and a second link which is pivotally connected to the arm between the first and second ends of the arm and to the body at a second mounting position which is forwards of the first mounting position, and the machine including an actuator which acts between the loading arm and the body to raise and lower the loading arm relative to the body, the first link of the mounting structure of the loading arm assembly including a first leg which provides for pivotal mounting to the body at the first mounting position, and a second leg which provides for the pivotal mounting to the loading arm at or adjacent the one end of the loading arm, the first and second legs subtending an obtuse angle between them with an apex of the obtuse angle pointing forwardly of the machine, wherein the apex pointing forwardly of the machine overlaps the loading arm when the loading arm is in a fully lowered position, the machine including a cab mounted on the body towards a second side of the body opposite to a first side of the body where the loading arm extends.

2. A machine according to claim 1 wherein the geometry of the first and second links and their positions of pivotal connection to the body and the arm provides that as the arm is raised and lowered, the second end of the loading arm, where the working implement is in use mounted, moves generally vertically up and down when the machine is generally level.

3. A machine according to claim 1 wherein the actuator is a linearly extendible actuator which is pivotally mounted at one end to the loading arm and at the other end, to the body.

4. A machine according to claim 3 wherein the actuator is pivotally mounted to the arm between where the first and second links are pivotally mounted to the loading arm.

5. A machine according to claim 3 wherein the actuator is pivotally mounted at a second end to the body between the first and second mounting positions.

6. A machine according to claim 1 wherein the first link provides for a shorter distance between its pivotal connections to the loading arm and the first mounting position of the body than the distance afforded by the second link between its pivotal connections to the loading arm and the second mounting position of the body.

7. A machine according to claim 1 wherein the cab is mounted at the front end of the body so that no part of the body extends significantly forwardly of the cab.

8. A machine according to claim 1 wherein the single loading arm of the loading arm assembly, at the second end of the arm, includes a transverse member which provides support for mounting of the working implement at the second end of the loading arm.

9. A machine according to claim 1 wherein the second link is straight between its pivotal mountings to the loading arm and the second mounting position of the body.

10. A machine according to claim 1 wherein the first leg of the first link defines a first link plate and the second leg of the first link defines a second link plate, the first and second leg joined together as a unitary component.

11. A machine according to claim 1, wherein the first and second legs of the first link form an elbow shape so that a middle portion of the first link does not overlap an imaginary straight line connecting the first mounting position and a third mounting position where the second leg is pivotally mounted to the loading arm.

12. A working machine comprising:

a body having a front end and a rear end, the body being provided with a ground engaging propulsion structure including a pair of wheels or a continuous loop track at either side of the body, and steering is effected by differentially driving the ground engaging propulsion structure, the ground engaging structure defining a skid steer loading machine, whereby the machine may be driven over the ground;

a loading arm assembly which includes a single loading arm which is mounted at one end relative to the body and which extends forwardly at or towards one side of the body, beyond the front end of the body, to a second end where there is a mounting for a working implement, the loading arm assembly including a mounting structure for mounting the loading arm to the body, the mounting structure including a first link which is pivotally connected at or adjacent the one end of the loading arm and also to the body at a first mounting position, and a second link which is pivotally connected to the arm between the first and second ends of the arm and to the body at a second mounting position which is forwards of the first mounting position;

an actuator which acts between the loading arm and the body to raise and lower the loading arm relative to the body;

the first link of the mounting structure of the loading arm assembly including a first leg which provides for pivotal mounting to the body at the first mounting position, and a second leg which provides for the pivotal mounting to the loading arm at or adjacent the one end of the loading arm, the first and second legs subtending an obtuse angle between them with an apex of the obtuse angle pointing forwardly of the machine, wherein the apex pointing forwardly of the machine overlaps the loading arm when the loading arm is in a fully lowered position; and a cab mounted on the body, the cab being offset from a center of the body towards a second side of the body opposite to a first side of the body where the loading arm extends.

* * * * *